US008156083B2

(12) United States Patent
Banerjee et al.

(10) Patent No.: US 8,156,083 B2
(45) Date of Patent: *Apr. 10, 2012

(54) DATABASE SYSTEM THAT PROVIDES FOR HISTORY-ENABLED TABLES

(75) Inventors: Jayanta Banerjee, Nashua, NH (US); Robert Hanckel, Amherst, NH (US); Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 744 days.

This patent is subject to a terminal disclaimer.

(21) Appl. No.: 11/291,446

(22) Filed: Dec. 1, 2005

(65) Prior Publication Data

US 2007/0130226 A1    Jun. 7, 2007

(51) Int. Cl.
*G07F 17/30* (2006.01)
(52) U.S. Cl. ................. 707/684; 707/679; 707/683
(58) Field of Classification Search .................... None
See application file for complete search history.

(56) References Cited

U.S. PATENT DOCUMENTS

| 5,848,405 | A  | * | 12/1998 | Norcott ................. 707/1 |
| 6,108,619 | A  | * | 8/2000  | Carter et al. ........... 704/9 |
| 6,223,182 | B1 |   | 4/2001  | Agarwal et al. |
| 6,556,217 | B1 | * | 4/2003  | Makipaa et al. ......... 345/667 |
| 6,662,357 | B1 | * | 12/2003 | Bowman-Amuah .... 717/120 |
| 6,782,006 | B1 | * | 8/2004  | Tanaka et al. .......... 370/468 |
| 6,957,217 | B2 | * | 10/2005 | Raverdy et al. ............ 1/1 |
| 7,707,226 | B1 | * | 4/2010  | Tonse .................. 707/796 |
| 7,913,157 | B1 | * | 3/2011  | Stoakley et al. ........ 715/203 |
| 7,979,447 | B2 | * | 7/2011  | DaCosta .............. 707/754 |
| 7,983,910 | B2 | * | 7/2011  | Subramanian et al. ... 704/250 |
| 2004/0210606 | A1 | * | 10/2004 | Brown et al. ........... 707/203 |
| 2005/0223415 | A1 | * | 10/2005 | Oho et al. ............. 726/27 |
| 2007/0255755 | A1 | * | 11/2007 | Zhang et al. .......... 707/104.1 |
| 2008/0033725 | A1 | * | 2/2008  | Peak et al. ............ 704/260 |
| 2008/0034276 | A1 | * | 2/2008  | Ficco ................ 715/201 |
| 2008/0077942 | A1 | * | 3/2008  | MacMillan et al. ..... 719/328 |
| 2008/0086757 | A1 | * | 4/2008  | Pestoni ............... 726/2 |
| 2008/0092182 | A1 | * | 4/2008  | Conant .............. 725/109 |

(Continued)

OTHER PUBLICATIONS

Vincent Lai, et al., "Temporal Databases: Model Design and Commercialization Prospects," Aug. 1994, Data Base, vol. 25, No. 3., pp. 6-18.*

(Continued)

*Primary Examiner* — Naveen Abel Jalil
*Assistant Examiner* — Farhan Syed
(74) *Attorney, Agent, or Firm* — Vista IP Law Group, LLP

(57) ABSTRACT

Techniques for history enabling a table in a database system so that past versions of rows of the history-enabled table are available for temporal querying. The table is history enabled by adding a start time column to the table and creating a history table for the history-enabled table. The start time field's value in a row of the history-enabled table indicates when the contents of the row last changed. The rows of the history table are copies of rows of the history-enabled table that have been deleted or updated. The rows include end time fields whose values indicate when the row was updated or deleted. A history table's row thus indicates a period in which the history table's row was in the history-enabled table. Temporal queries are performed on a view which is the union of the history-enabled table and the history table.

35 Claims, 6 Drawing Sheets

U.S. PATENT DOCUMENTS

| | | | |
|---|---|---|---|
| 2008/0222546 A1* | 9/2008 | Mudd et al. | 715/765 |
| 2009/0164301 A1* | 6/2009 | O'Sullivan et al. | 705/10 |
| 2009/0187575 A1* | 7/2009 | DaCosta | 707/10 |
| 2009/0271247 A1* | 10/2009 | Karelin et al. | 705/10 |
| 2010/0023506 A1* | 1/2010 | Sahni et al. | 707/5 |
| 2010/0050211 A1* | 2/2010 | Seldin et al. | 725/46 |
| 2010/0082684 A1* | 4/2010 | Churchill et al. | 707/784 |
| 2010/0115051 A1* | 5/2010 | Robert et al. | 709/217 |
| 2010/0121936 A1* | 5/2010 | Liu et al. | 709/217 |
| 2010/0186041 A1* | 7/2010 | Chu et al. | 725/46 |

OTHER PUBLICATIONS

Richard T. Snodgrass, "Developing Time-Oriented Database Applications in SQL" Introduction and Chptr. II (pp. 40).

"Oracle Flashback Technology", Oracle Technology Network (pp. 6) http://wwvv.oracle.com/technology/deply/availability/htdocs/Flasback_Overview.htm.

Tal Kelley, "Using Triggers to track database action history—Printer Friendly Version" (pp. 3) http://www.developerfusion.com/scripts/print.aspx?id-2413.

Nascimento, Mario et al., "Indexing Valid Time Databases via B+ trees—The MAP21 Approach," TimeCenter Technical Report, Mar. 9, 1998, pp. 1-26.

Vincent Lai, et al., "Temporal Databases: Model Design and Commercialization Prospects," Data Base, Aug. 1994, vol. 25, No. 3, pp. 6-18.

Mario A. Nascimento and Margaret H. Dunham, "Indexing Valid Time Databases Via B+ -trees—The MAP21 Approach", A TimeCenter Technical Report, Mar. 9, 1998.

* cited by examiner

| order_id | order_dt | cust_name |
|---|---|---|
| 1 | 1/2/2000 | Jones |
| 2 | 1/2/2000 | Smith |
| 3 | 1/4/2000 | Green |
| 4 | 1/5/2000 | Miller |
| 5 | 1/7/2000 | Meyer |
| 6 | 1/10/2000 | Mulligan |

Order list 403 of orders received from 1/1/2000-1/12/2000

| order_id | order_dt | cust_name | start_time |
|---|---|---|---|
| 3 | 1/4/2000 | Green | 1/4/2000 |
| 5 | 1/7/2000 | Meyer | 1/7/2000 | history-enabled table "Orders" 405 as of 1/12/2000

| order_id | order_dt | cust_name | start_time | end_time |
|---|---|---|---|---|
| 1 | 1/2/2000 | Jones | 1/2/2000 | 1/5/2000 |
| 2 | 1/2/2000 | Smith | 1/2/2000 | 1/5/2000 |
| 4 | 1/5/2000 | Miller | 1/5/2000 | 1/8/2000 |
| 6 | 1/10/2000 | Mulligan | 1/10/2000 | 1/11/2000 |

"Orders_HISTORY$" 407 as of 1/12/2000

| order_id | order_dt | cust_name | start_time | end_time |
|---|---|---|---|---|
| 1 | 1/2/2000 | Jones | 1/2/2000 | 1/5/2000 |
| 2 | 1/2/2000 | Smith | 1/2/2000 | 1/5/2000 |
| 4 | 1/5/2000 | Miller | 1/5/2000 | 1/8/2000 |
| 6 | 1/10/2000 | Mulligan | 1/10/2000 | 1/11/2000 |
| 3 | 1/4/2000 | Green | 1/4/2000 | ######## |
| 5 | 1/7/2000 | Meyer | 1/7/2000 | ######## |

"Orders_HISTORY_VIEW$" 409 as of 1/12/2000

Fig. 4

| order_id | cust_name |
|---|---|
| 1 | Jones |
| 2 | Smith |
| 3 | Green |

501

| order_id | cust_name |
|---|---|
| 1 | Jones |

503

| order_id | order_dt | cust_name | start_time | end_time |
|---|---|---|---|---|
| 1 | 1/2/2000 | Jones | 1/2/2000 | 1/5/2000 |
| 2 | 1/2/2000 | Smith | 1/2/2000 | 1/5/2000 |
| 4 | 1/5/2000 | Miller | 1/5/2000 | 1/8/2000 |
| 3 | 1/4/2000 | Green | 1/4/2000 | ######## |
| 5 | 1/7/2000 | Meyer | 1/7/2000 | ######## |

505

| order_id | cust_name |
|---|---|
| 4 | Miller |
| 6 | Mulligan |
| 3 | Green |
| 5 | Meyer |

DATABASE SYSTEM THAT PROVIDES FOR HISTORY-ENABLED TABLES

CROSS-REFERENCE TO RELATED APPLICATIONS

U.S. Ser. No. 11/292,138, Techniques for implementing indexes on fields of database tables whose values specify periods of time, filed on even date with the present patent application and having the same inventors and assignee, contains the complete Detailed description from the present patent application and additional material describing time period indexes that may be used with the history tables disclosed herein. U.S. Ser. No. 11/292,138 is hereby incorporated by reference into the present patent application for all purposes.

STATEMENT REGARDING FEDERALLY SPONSORED RESEARCH OR DEVELOPMENT

Not applicable.

PARTIES TO A JOINT RESEARCH AGREEMENT

Not applicable.

SEQUENCE LISTING

Not applicable.

BACKGROUND OF THE INVENTION

1. Field of the Invention

The invention relates generally to database systems and more particularly to techniques by which a database system can automatically maintain a history of the changes made in a table belonging to the database system.

2. Description of Related Technology

The technology that is related to the disclosed database system that provides for history-enabled tables falls into two broad categories:
  Techniques for keeping track of insertions, updates, and deletions so that errors occurring during operation of the database system may be corrected; these techniques then form the basis of techniques for determining the past state of records and transactions in the database system; and
  Techniques for dealing with time information in database tables.

The techniques relative to these categories are explained in the following.

Keeping Track of Insertions, Updates, and Deletions in Database Systems

Most database tables contain only currently-valid information; when a row in the database table is updated or deleted, the information contained in the row prior to its modification or deletion is lost. It soon became apparent to database users that keeping the information that was discarded in the update or deletion was worthwhile. To begin with, the reason for keeping the information was to restore the original information if the update or deletion had been erroneously made. Possible sources of errors included the humans who were entering the data or administering the database system, bugs in queries and programs being executed in the database system, and transactions which failed before they could be completed and therefore had to be rolled back. A transaction in the present context is a sequence of database operations which the database system treats as a single unit: if all of the operations in the sequence are not completed, the transaction is rolled back by undoing all of the operations that did complete. When all of the operations have been undone, the database has been restored to the state it was in before the failed transaction took place with regard to the failed transaction. If the conditions that caused the transaction to fail have been eliminated, the transaction can then be redone. The database system maintained a redo log in which it kept a record of every change made in the database system; the redo log thus contained the information needed to correct mistakes or redo transactions. The only limitation on the redo log for correcting mistakes or redoing transactions was the amount of storage available in the database system for the redo log: the database system treated the redo log's storage as a circular buffer; when the buffer was full, the database system continued to write the redo log by overwriting the oldest entries in the log.

Early database systems allowed only one user to access them at a time; modern database systems may be accessed by hundreds of users at once. One consequence of this is that transactions for a number of users may be accessing the same database record at the same time. If everyone who is accessing the database record is simply reading the database record, such concurrent access presents no problem, but if some are reading the record and others are modifying the record, inconsistencies may result. For example, in a read-only transaction by a first user, the record should not change during the transaction, i.e., a read at the beginning of the transaction and a read at the end should have the same results. However, if another transaction by a second user changes the record during the first transaction, the two reads will not have the same result. One way of keeping this from happening is to use the copy of the record to be read in the redo log for both the first and second read. Database systems manufactured by Oracle Corporation, of Redwood City Calif., have long used this technique; recently, the SQL Server database system manufactured by Microsoft Corporation has begun employing a technique in which the version of a record that exists at the beginning of a transaction is maintained until the transaction is finished.

Eventually, designers at Oracle Corporation realized that the redo log was valuable not only to deal with errors and concurrency problems, but also as a source of historical information about the tables in the database system. Because the redo log had a record for every change made in the database system, it could be mined to find out what a table had looked like at a particular point in the past or to obtain a sequence of the changes made over time with regard to a single entity in the database system. In 2003, Oracle Corporation introduced a utility for reading the history of information in the database system from the redo log. This utility, termed Flashback, permitted users to query the redo log as if they were querying tables in the database system. The user specified a time in a query and Flashback reconstructed a snapshot of the tables in the query as they were at the specified time from the redo log and then performed the query on the reconstructed tables. The information from the query could be used to restore a table to a previous state or simply to see what the table looked like at the specified time. The user could also specify two times, and Flashback returned records as they had changed between the times. Of course, as with everything else that uses information in the redo log, Flashback can go no further back than the oldest available portion of the redo log. Another consequence of reconstructing the tables from the information in the redo log is that the further back into the redo log the database system has to go to reconstruct the table, the longer the reconstruction takes.

Techniques for Dealing with Time in Database Tables

There are of course many situations in which a user will include time information in a database table. A systematic discussion of the ways in which this may be done and of the difficulties that SQL, the standard language used to write queries in relational database systems, has in expressing queries involving time information may be found in Richard T. Snodgrass, *Developing Time-oriented Database Applications in SQL*, Morgan-Kaufmann Publishers, San Francisco, USA, 2000. Useful terminology from the Snodgrass book includes the following:

There are three fundamental temporal datatypes:
Instant: something happened at an instant of time (e.g., now, Jul. 18, 2005, when this is being written, or sometime, perhaps much later, when it is being read)
Interval: a length of time (e.g., three months)
Period: an anchored duration of time (e.g., the fall semester, Aug. 24 through Dec. 18, 1998)

There are three fundamental kinds of time.
User-defined time: an uninterpreted time value
Valid time: when a fact was true in the reality being modeled in the table
Transaction time: when a fact was stored in the database These kinds of time are orthogonal: a table can be associated with none, one, two, or even all three kinds of time. Snodgrass terms a table which is associated with valid time a valid-time state table; he terms a table which is associated with transaction time a transaction-time state table; he terms a table which is associated with both kinds of time a bitemporal table. Transaction-time state tables have the property that they can be reconstructed as of a previous date. Valid time state tables and bitemporal tables permit queries involving specific points in time and periods of time. Such queries are termed in the following temporal queries. Examples are a query to determine what versions of the table's rows were in the table as of a given date and a query to determine what versions of the table's rows were in the table during a given period of time.

In Snodgrass' examples, the transaction-time state for a table is simply incorporated into the table; a paper by Tal Kelly, Using Triggers to track database action history from the year 2001, which was found in July 2005 at developerfusion.com/scripts/print.aspx?id=2413, describes a technique for associating a history database table with a primary table. A row is inserted in the history table whenever a row is inserted into the primary table or an existing row in the primary table is updated. The history table has columns that are equivalent to those in the primary table and has additional columns that indicate the time at which the row in the primary table was inserted or updated and the operation in the primary table that resulted in the row being inserted in the history table. When a row is inserted in the primary table, the row inserted into the history table includes the data from the primary table row, the time the row was inserted in the primary table, and indicates that the operation was "insert". When a row is updated in the primary table, the row that is inserted in the history table has the data from the primary table row as it was before the update, the time the row was updated in the primary table, and indicates that the operation was "update".

The rows are inserted into the history table by triggers, that is, user-written code that is automatically executed by the database system when certain events occur with regard to a table. Two of the events which may result in the execution of a trigger are the insertion of a row and the update of a row; thus, an insertion of a row in the primary table results in an execution of an insert trigger that creates the row corresponding to the insertion operation in the history table; similarly, the update of a row results in an execution of an update trigger that creates the row corresponding to the update operation.

It should be pointed out here that the history table is an example of a transaction-time state table, albeit one that is rather hard to use, because Kelley's history table entry only specifies when the operation on the primary table that resulted in the creation of the row in the history table creation was performed and because the meaning of the time value depends on the operation on the primary table that caused the history table row to be created: in the case of an insertion, the time value indicates when the corresponding row in the primary table began existing; in the case of an update, the time value indicates when the corresponding row in the primary table ceased existing in the form specified in the history table row. Thus, using Kelley's history table to figure out the time period during which a given row of the history table existed in the primary table is a complex and expensive operation.

As can be seen from the foregoing, currently-available techniques for keeping track of the history of a file in a relational database system have their drawbacks: Flashback is easy to use but requires a relational database system that keeps a redo log and is limited by the redo log: if the information for the table to be reconstructed is no longer in the redo log, Flashback cannot reconstruct the table; further, the time it takes to reconstruct the table is determined by how much of the redo log Flashback has to read to obtain the information necessary to reconstruct the table. It is of course possible for users of database systems to implement their own arrangements for keeping track of the history of tables of interest, but as the Snodgrass book demonstrates, more than ordinary expertise in SQL is required to properly construct and use arrangements for keeping track of the history of tables, and the Kelley reference serves as an illustration both of the required programming expertise and of some of the pitfalls involved in making one's own arrangements to keep track of the history of a table. What is needed is a technique for keeping track of the history of individual tables of interest which is as easy to use as Flashback but does not depend on the redo log and consequently is not limited by the amount of redo log available and does not require reading the redo log. It is an object of the invention disclosed herein to provide such a technique.

BRIEF SUMMARY OF THE INVENTION

The foregoing object of the invention is achieved by techniques for making a history-enabled table which preserves past versions of rows of the history-enabled table and permits temporal queries on the past versions. The history-enabled table's columns include a set of other columns, a start time column, and a period column. The history-enabled table's rows include a set of current rows and a set of history rows. Each current row contains current values of the fields that belong to the set of other columns and a start time value which indicates the time at which the most recent change in the current values occurred. The set of history rows have copied fields belonging to the set of other columns or a subset thereof and a row period field belonging to the period column. When a current row is deleted or updated, the values of the copied fields are copied from the current row prior to the update or deletion and the row period field's value is set to indicate the period between the copied current row's start time value and the time of the update or deletion of the copied current row.

In one embodiment, the history-enabled table is made up of two tables and a view: One of the tables is made by adding the start time column to the other columns and contains the set of current rows. Another of the tables contains the set of history rows. The temporal queries are performed on a view which is a union of the first table and the second table.

Another aspect of the invention is techniques for creating and maintaining the history-enabled table. Apparatus for so doing includes a table that is to be history enabled, a history-enabled table creator that makes a current row table and a row history table, and a history-enabled table maintainer that responds to a change in a field in a row of the current row table by making a history table row that is a copy of the row of the current row table prior to the change, setting the history table row's row period value to indicate the period between the time indicated in the copied current row table row's start time value and the time at which the change occurred, and setting the start time value in the changed current table row to the time at which the change occurred. A method for creating and maintaining the history-enabled table is also set forth.

A third aspect of the invention is a method of setting a time field in a row in a relational database management system where the value of the time field indicates the time of an event that is part of a transaction that is performed in the database system. The method steps include setting a transaction identifier field that is related to the time field in the relational database management system to a transaction identifier for the transaction, setting the time field in the row to a time that is during the transaction but prior to the transaction being committed, after the transaction has been committed, using the transaction identifier in the related field to determine the commit time of the transaction, and setting the time field in the row to the commit time.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWING

FIG. 4 is an example history-enabled table;

FIG. 5 shows sets of rows returned by temporal queries on Orders_HISTORY_VIEW$ table 409.

Figure 1:
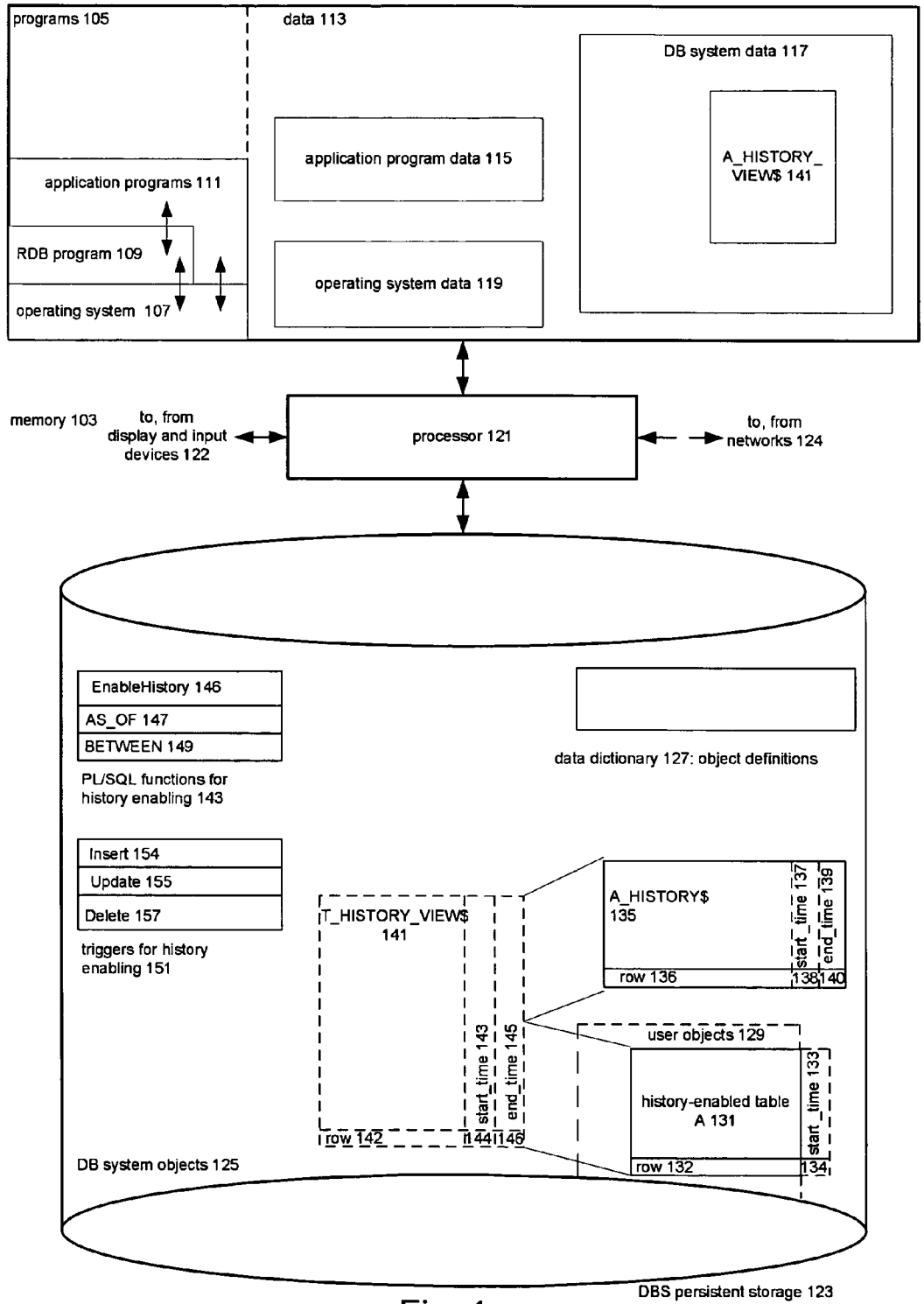
FIG. 1 shows a relational database management system in which history-enabled tables has been implemented.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The following Detailed Description will begin with a description of a relational database system in which history-enabled tables may be implemented, will then provide overviews of how history-enabled tables are implemented in the relational database system and of operations on history-enabled tables, and will finally provide a detailed example of a history-enabled table.

A Relational Database System in which History-Enabled Tables may be Implemented: FIG. 1

The history-enabled tables disclosed herein may be implemented in any relational database system. FIG. 1 shows the portions of a typical relational database system 101 that are relevant to the present discussion and how history-enabled tables are implemented in database system 101. The main components of system 101 are a processor 121, a memory 103 which contains programs 105 being executed by the processor and data 113 involved in the program executions, and persistent storage 123 for the database system's tables and other objects. Processor 121 may further receive inputs from input devices such as a keyboard and/or pointing device and produce outputs to a display device such as a CRT, as shown at 122, and may also receive inputs from and provide outputs to one or more networks, containing other processors, as shown at 124.

When system 101 is operating, programs 105 in memory 103 include an operating system 107, a relational database system program 109, and application programs 111 that employ the services provided both by operating system 107 and database program 109.

Correspondingly, data 113 in memory 103 includes data for the application programs 115, data for the operating system 119, and data for the database system. Operation typically involves an application program 111, which provides a query to relational database program 109. Database program 109 executes the query on the tables in persistent storage 123 and provides the result to application program 111. Both RDB program 109 and application program 111 use the services provided by operating system 107, and execution of the application program or the database RDB program may involve inputs from and outputs to I/O devices and the network.

Continuing in more detail, persistent storage 123 contains two classes of objects: DB system objects, which are objects, including tables, that are defined by database system 101 and are used by database system 101 to manage and operate the database system, and user objects 129, which contain tables and other objects defined by users of the database system. Data dictionary 127 contains definitions of all of the objects in the database system.

The most important objects in database system 101 are tables. A table defines a set of rows, all of which have the same columns. There are three kinds of tables in most database systems: base tables, views, and materialized views. Base tables are the tables that are the actual sources of the data in the table rows returned by a query. Views are tables which do not exist in their own rights in persistent storage 123, but are instead created using data from other tables. A view is defined in the data dictionary by a query on other tables. The other tables may also be views, but the data must ultimately come from base tables. A materialized view is a view of which, for reasons of efficiency, a copy has been made in persistent memory. Data dictionary 127 contains definitions of base tables, of tables defined in terms of the base tables, and definitions of other objects that are defined for the tables. These other objects include indexes, which speed up access to the data contained in a column of a table, triggers, which define actions to be taken upon occurrence of events concerning the table, and functions, which are programs that operate on database system objects. In a preferred embodiment of database system 101, the functions are written in the well-known PL/SQL language.

Implementing a History-Enabled Table in Database System 101

FIG. 1 shows the objects in database system 101 that are required to implement a history-enabled table. Except for the table which is being history-enabled, all of the objects that implement the history-enabled table are system objects that are defined by RDBMS 101. In RDBMS 101, the table that has been history-enabled is table A 131. The table that is history-enabled will generally be user-defined, but may of course be system-defined as well. In the preferred embodiment, any table which is defined as one that can exist in RDBMS 101, i.e., is a base table or a materialized view, may be history enabled.

History-Enabled Tables and Related Tables and Views

When table A 131 is history-enabled, RDBMS 101 adds a system-defined column to the table. The column, which appears as start_time column 133 in table A, contains time stamp values. For each row 132 in table A, the time stamp value in start_time column 133 indicates when the row last changed. Thus, when the row is first inserted into the table, the row's start_time field is set to the time at which the row was inserted; each time the row is updated, the row's start_time field is set to the time at which the row was updated.

Besides adding start_time column 133 to the history-enabled table, RDBMS 101 creates a new table A_HISTORY$ 135 which contains copies of rows that have changed in table A 131. The change may be either an update of the row or a deletion of the row. Each row 136 in table A_HISTORY$ 135 contains the data for a changed row 132 in table A as it was prior to the change, including the value of the row 132's start_time field 133, as may be seen from start_time column 137 in A_HISTORY$ table 135. Table 135 thus has all of the columns of table A 131. In addition to having all of the columns of table A 131, A_HISTORY$ 135 has another timestamp column, which appears in FIG. 1 as end_time column 139. The value of this column in each row 136 is set to the time at which the update or deletion operation on table A 131 occurred which caused the copy of the row to be made in A_HISTORY$ 135.

Thus, the values in the fields belonging to start_time 137 and end_time column 139 indicate the period during which the row 132 of which row 142 is a copy existed in history-enabled table A 131. As can be seen from this description, A_HISTORY$ table 135 is thus what Snodgrass terms a transaction-time state table with regard to all rows 132 of table A 131 which have been deleted or updated since they were inserted into table A. Tables A 131 and A_HISTORY$ 135 between them are further a transaction-time state table with regard to all rows of table A 131 that have existed since table A was history-enabled.

RDBMS 101 produces this complete transaction-time state table for table A 131 by means of system-defined A_HISTORY_VIEW$ 141, which is a union of all of the rows 132 from table A 131 with all of the rows 136 from A_HISTORY$ table 135. View A_HISTORY_VIEW$ 141 has all of the columns of A_HISTORY$ table 135, including start_time column 143 and end_time column 145; when a row 142 of A_HISTORY_VIEW$ 141 comes from table A 131, it has a symbolic value of −1 in its field in end_time column 145, indicating that the row 142 corresponds to a row 132 that still exists in table A 131.

Figure 2:
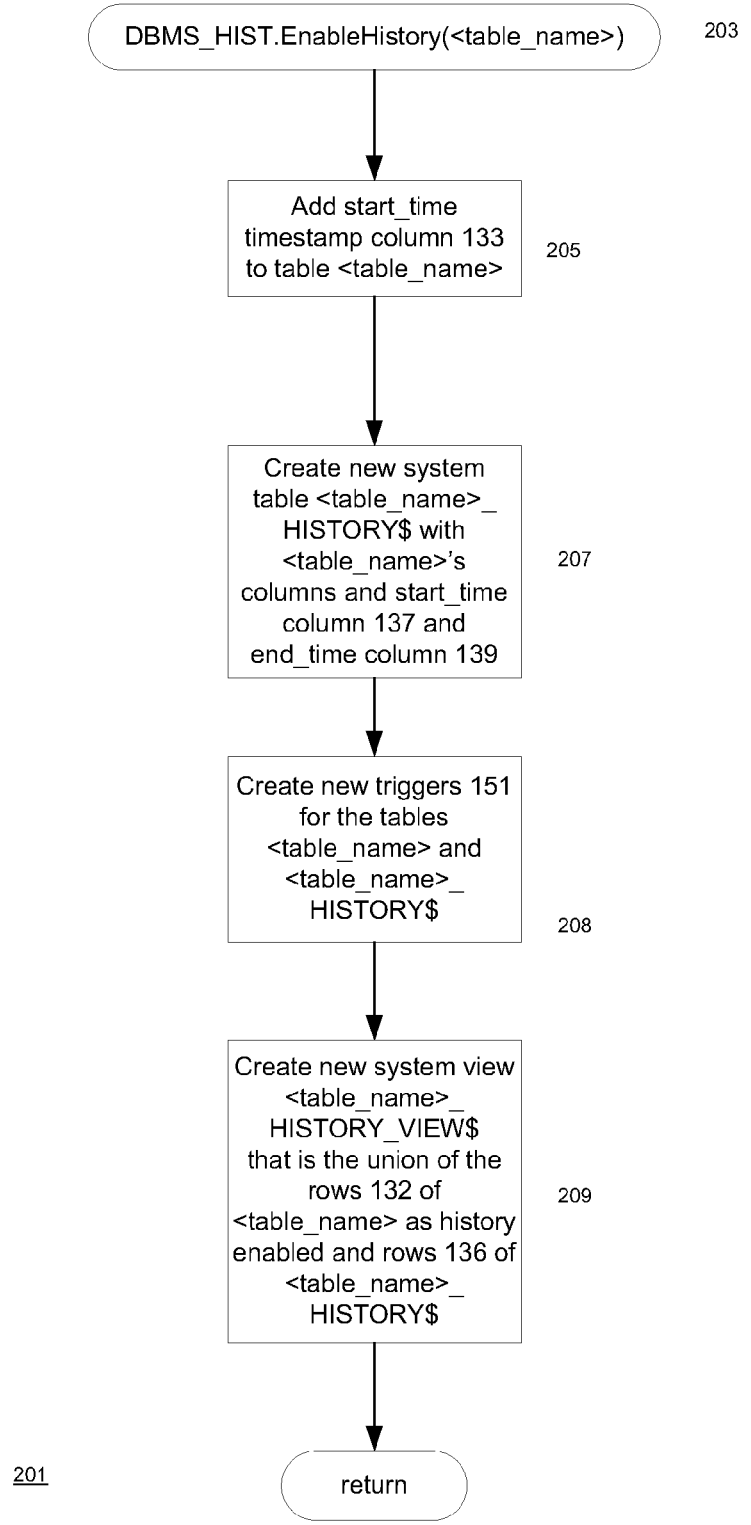
FIG. 2 is a flowchart of the EnableHistory PL/SQL procedure.

Making a Table Into a History Enabled Table: FIG. 2

In a preferred embodiment of RDBMS 101, RDBMS 101 includes a system-provided PL/SQL procedure called DBMS_HIST. EnableHistory. The procedure is shown at 146 in FIG. 1. In a preferred embodiment, the procedure takes a single argument: the name of the table in RDBMS 101 which is being history-enabled. Of course, the name may be a value returned by a PL/SQL function that defines the table and returns its name. In other embodiments of EnableHistory, the arguments may contain the information needed to define the table to be history enabled. FIG. 2 is a flowchart 201 of DBMS_HIST. EnableHistory 146.

The PL/SQL interface for invoking EnableHistory 146 is shown at 203. When executed, the code performs four operations:

it adds start_time timestamp column 133 to the definition in RDBMS 101 of the table 131 that is being history enabled (205);

it creates HISTORY$ table 135 corresponding to history-enabled table 131. Table 135 has all of the columns of table 131 as history enabled, and additionally has end_time timestamp column 139 (207);

it creates the triggers 151 that maintain the start_time fields 134 in history-enabled table 131 and the start_time fields 138 and the end_time fields 140 in A_HISTORY$ table 135 (208); and it creates HISTORY_VIEW$ view 141 corresponding to history-enabled table 131. View 141's rows 142 are the union of the rows 132 of the history-enabled table and rows 136 of HISTORY$ table 135 (209).

An important advantage of history-enabled tables such as table 131 is that they can be new tables which include a start_time column 133 or be made from preexisting tables by simply adding start_time column 133 to the preexisting table. When a preexisting table is history enabled, a question arises as to how the time stamps in start_time column 133 should be set for the rows that were in table 131 at the time it was history enabled. The preferred embodiment offers the user two choices in this regard:

start_time for all of the preexisting rows is set to the time at which the table was history-enabled; or start_time for the preexisting rows is set to the time at which the table was created; this time is obtainable from the definition of the table in data dictionary 127.

In the preferred embodiment, the default is the time at which the table was history enabled; a parameter in the invocation of EnableHistory may be used to specify the other alternative.

Figure 3:
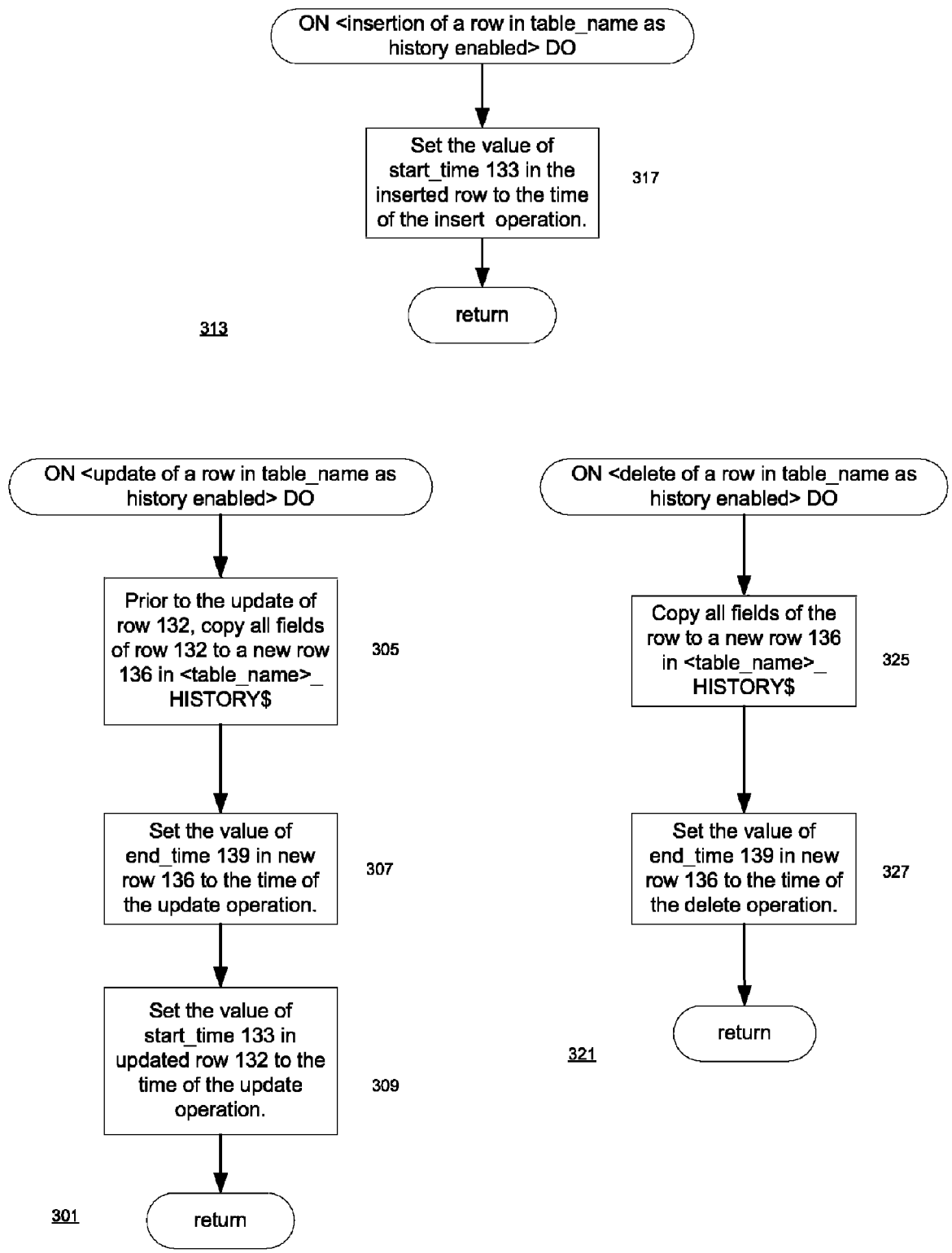
FIG. 3 is flowcharts of triggers used in a preferred embodiment.

Maintaining a History-Enabled Table: FIG. 3

Once a table has been history-enabled, start_time fields 133 in the table's rows 132 and the rows of HISTORY$ table 135 are maintained by triggers that are executed whenever a row 132 is inserted, updated, or deleted. There is a trigger for each of these actions. The triggers are shown at 151 in FIG. 1 and FIG. 3 has flowcharts for the triggers.

Shown at 313 is the flowchart for insert trigger 154. The only action performed by this trigger is setting the value of start_time field 133 in the row to the time of the insert operation (317). The flowchart for update trigger 155 is shown at 301. Prior to the update on row 132, trigger 155 copies all of the fields of the updated row to a new row 136 in HISTORY$ table 135 (305). Then trigger 155 sets the value of end_time field 139 in new row 136 to the time of the update operation (307). Finally, trigger 131 sets the value of start_time field 133 to the time of the update operation (309). The flowchart for delete trigger 157 is shown at 321. As may be seen there, steps 325 and 327 are identical with that of steps 305 and 309 of the update operation, except that because the row 132 in history-enabled table 131 is being deleted, there is no deed to update that row's start_time field 133.

Performing Temporal Queries on a History-Enabled Table

When a table is history enables, temporal queries may be executed on HISTORY_VIEW$ view 141. As a view, HISTORY_VIEW$ is constructed by RDBMS 101 in DB system data 117 when the query on the view is executed. The start_time field 143 and end_time field 145 in each row of HISTORY VIEW$ specifies either a period of time which has ended (if the row is from HISTORY$ table 135) or a period of time which has not yet ended (if the row is from history-enabled table 131). In a preferred embodiment, two queries are permitted over these periods of time: AS_OF 147, which takes a given instant of time as a parameter and determines what rows 142 in HISTORY_VIEW$ 141 have periods of time defined by fields 143 and 145 such that the instant of time is included in those periods, and BETWEEN 149, which takes a given period of time as parameter and determines what rows 142 have periods of time defined by fields 144 and 146 such that the given period of time overlaps some or all of the row's period of time. It must be noted that the AS_OF operator always returns at most one historical incarnation of any row of the history-enabled table. The BETWEEN operator, in contrast, may return multiple incarnations of any row of the history-enabled table. Other quires are possible with regard tot eh periods of time: whether the given period of time is contained in the row's period of time, whether it spans the row's period of time, whether the given period of time abuts but is before the row's period of time, and whether the given period of time abuts but is after the row's period of time. Other ways of representing the periods of time are also possible. Among them are a single timestamp column and an interval of time column and a single timestamp column and other information in the table from which the period of time can be computed given the time stamp.

In a preferred embodiment, AS_OF and BETWEEN are both implemented as PL/SQL functions that are employed in the WHERE clause of an SQL query. The functions construct subqueries from the arguments in the function that return rows that satisfy the AS_OF condition or the BETWEEN condition. The AS_OF function invocation looks like this:

AS_OF (<HISTORY_VIEW$ table name>,<date>)
The subquery that AS_OF produces looks like this:

```
SELECT * FROM <HISTORY_VIEW$ table name> WHERE
  (<date> ≥ start_time) AND ((<date> ≤ end_time) OR
  (end_time = −1))
```

The BETWEEN function invocation looks like this:
BETWEEN(<HISTORY_VIEW$ table name>, <lb_date>, <ub_date>) where <lb_date> is the lower bound of the given period of time and <ub_date> is its upper bound.
The subquery that BETWEEN produces looks like this:

```
SELECT * FROM <HISTORY_VIEW$ table name> WHERE
  (<ub_date> ≥ start_time) AND ((<lb_date> ≤ end_time) OR
  (end_time = −1))
```

It should be pointed out at this point that the exact syntax used to history enable a table or to invoke a temporal query on the table is a matter of designer's choice and may vary from one SQL implementation to another. In the preferred embodiment, PL/SQL functions are used for the interfaces and the fact that the temporal query is performed on the HISTORY_VIEW$ view is not hidden from the user; in other embodiments, the SQL language may be extended to permit a table to be history-enabled and temporal queries to be made on it without the use of PL/SQL functions and the HISTORY_VIEW$ view may be hidden from the user. Similarly, the temporal query operations provided, the names that are given them, their semantics, and their syntax are a matter of designer's choice and may vary from one SQL implementation to another.

An Example: FIGS. 4 and 5

FIG. 4 presents an example 401 of a small history-enabled table Orders 405. The table has four columns: order_id, which is the ID number for an order, order_dt, which is the date the order was received, cust_name, which is the name of the customer making the order, and start_time, which the RDBMS added to Orders when it was history enabled. Orders is a table of orders that are currently being processed: when an order is received, an entry is made in Orders; when the order has been filled, the entry is deleted. Updates occur only when the data in the table has to be corrected. The invocation of DBMS_HIST. EnableHistory that history enabled the table looked like this:

DBMS_HIST.EnableHistory('Orders')

At 403 is shown a list of orders received from Jan. 1, 2000 through Jan. 12, 2000. This list is not kept in the RDBMS, but is provided here to aid in understanding the contents of the tables of FIG. 4.

Because Orders is history enabled, the RDBMS that contains Orders also contains Orders_HISTORY$ 407, which has a row for every row has been updated or deleted from Orders. The rows in Orders_HISTORY$ thus include a row for every order which has been filled. Finally, the RDBMS provides the view Orders_HISTORY_VIEW$, which is the union of the rows that are currently in Orders 405 and Orders_HISTORY$ 407. Orders 405, Orders_HISTORY$ 407, and Orders_HISTORY_VIEW$ 409 are all shown as they are as of Jan. 12, 2000. As already explained, the rows in Orders_HISTORY$ 407 are inserted into table 407 by a trigger that is executed whenever a delete or update operation is performed on a row of Orders 405 and view 409 is the union of tables 405 and 407.

As can be seen from Orders 405 and Orders_HISTORY$ 407, filling an order generally takes three days; two orders, numbers 3 and 5, however, are taking longer, and one order, number 6, was filled in a single day. The fact that 3 and 5 have not yet been filled is indicated in Orders_HISTORY_VIEW$ 409 by #### in the end_time field.

Some example temporal queries on Orders_HISTORY-VIEW$ 409 are the following:

```
SELECT t.order_id, t.cust_name FROM Orders_HISTORY_VIEW$ t
  WHERE AS_OF(t, '1/4/2000') = 1
```

For each row that the AS_OF operator is evaluated on, the value returned by the operator is either true or false. In a preferred embodiment, if the value is false, AS_OF evaluates to 0; if true, AS_OF evaluates to 1. The above query returns rows for all of the orders that were in the process of being filled on Jan. 4, 2000; The rows are shown at 501 in FIG. 5. Note that they include the row for order 3, which, since it still has not been filled, is still in Orders table 605.

Of course, the output of AS_OF may be further filtered by other elements of the WHERE clause:

```
SELECT t.order_id, t.cust_name FROM Orders_HISTORY_VIEW$ t
  WHERE t.cust_name = 'Jones'
    AS_OF(t, '1/4/2000') = 1
```

This query returns the single row shown at 503.
Here are some BETWEEN queries:

```
SELECT * FROM Orders_HISTORY_VIEW$ t
    WHERE BETWEEN (t, '1/4/2000',
    '1/7/2000') = 1
```

BETWEEN returns true or false in the same fashion as AS_OF. The above query returns all of the orders that were in process between the two dates given, including those for which the processing had begun before Jan. 4, 2000, but finished during or after Jan. 7, 2000 and those for which the processing had begun on or after Jan. 4, 2000 and finished after Jan. 7, 2000. As shown at 505, the returned rows are thus the rows for every order but order 6, for which the processing began after Jan. 7, 2000.

Another example, for the time period Jan. 8, 2000 and Jan. 10, 2000, this time with only the order_id and cust_name columns being selected:

```
SELECT t.order_id, t.cust_name FROM Orders_HISTORY_VIEW$ t
    WHERE BETWEEN (t, '1/8/2000',
    '1/10/2000')
```

The result is shown at 507; the data comes from all of the orders but the first two, for which processing was finished before the beginning of the time period specified in the query.

Determining What Values to Use for Start_Time and End_Time

In the foregoing discussion, we have presumed that the database transactions in which the insertion and update operations occur which set the time stamp value of a start_time field 133 or the update and deletion operations occur which make new rows in HISTORY$ table 135 and set the time stamp values of start_time field 137 and end_time field 139 are substantially instantaneous; in fact, however, the lengths of transactions may vary, and some transactions may continue for a considerable period of time. Further, transactions may overlap; one transaction may start earlier and end later than another transaction. There are three times in a transaction that can be used to the start_time and end_time timestamps:

- the transaction start time: the time at which the transaction that inserts, updates, or deletes a row in history-enabled table 131 begins;
- the transaction commit time: the time at which the transaction commits, i.e., the time at which the database system actually makes the changes to the database system that occur during the transaction permanent; and
- the DML time for the change that causes the timestamp to be set. The DML time is the time in the transaction at which the row is inserted, updated, or deleted, but the transaction has not yet been committed. DML stands here for Data Manipulation Language, the subportion of the SQL query language that is used to manipulate the data in a database table. Insert, update, and delete are all DML operations.

Each of these times can be used for the start_time and end_time timestamps and each has difficulties.

The most accurate time to use is the commit time of a transaction. At that time, all DML operations (update, insert, delete) have been committed, and all changes to the database become permanently available for the future. However, there is an overhead associated with using the transaction end time. When a DML operation happens, the commit time for the transaction performing the DML operation is not yet known; consequently, the DML operation cannot set the start_time and end_time fields. Instead, these fields must be set by an additional commit trigger which is executed when the transaction that performed the DML operations is committed. The need to execute the commit trigger requires extra CPU time and occasionally added I/O time for rows that have been paged out by the database system's paging algorithm and must be paged back in in order to set the start_time and end_time fields.

The start time of the transaction is known when the insert, delete, or update operation is performed, so the start_time and end_time fields can be set as part of the insert, delete, or update operation. The problem comes when a short transaction T2 starts after and commits before a long transaction T1. Starting after T1, but before T1 has touched row R, T2 updates row 132 in history-enabled table 131 R to R', so that R is copied to a new row 136 in HISTORY$ table 135. The timestamps in row R' 132's start_time field 143 and in row R 136's end_time field 139 are both set to the start time of T2, T2start. After T2 commits, T1 updates row R' 132 to R" in history-enabled table 131 and copies R' to a new row 136 in HISTORY$ table 135. The timestamps in row R" 132's start_time field 143 and in row R' 136's end_time field 139 are both set to the start time of T1, T1start, which is earlier than T2start. Thus, R" will have an earlier timestamp than R' even though the change that produced R' happened earlier than the change that produced R".

Using the DML time to set the timestamp values in start_time fields 133 and end_time fields 139 avoids both the extra overhead of using the transaction's commit time and the possible inconsistencies of using the transaction's start time. The difficulty with using the DML time is that there is a potential for seeing inconsistent historical data when a transaction is long and a query is made during the transaction which simultaneously views two time-separated updates. For example, assume that a transaction performs a transfer of $100 from a checking account to a savings account on a day X as follows: at 1:00, the transaction deducts the $100 from the checking account; at 2:00, the transaction adds the $100 to the savings account. If the table for the checking account and the table for the savings account are both history-enabled, the start_time timestamp for the copy of the row affected by the transaction in the checking account table's HISTORY$ table 135 will say 1:00. The end_time time stamp for the copy of the row affected by the transaction as it was prior to the transaction in the savings account's HISTORY$ table will say 2:00. If an AS_OF query is later made of the savings and checking account tables to see the combined balance in the two accounts as it was as of 1:30 on day X, the AS_OF query will see the record for the deduction in the checking account table's HISTORY$ table, but will not see the record for the addition to the savings account in the savings account table's HISTORY$ table and the total balance will be $100 too low.

Figure 6:
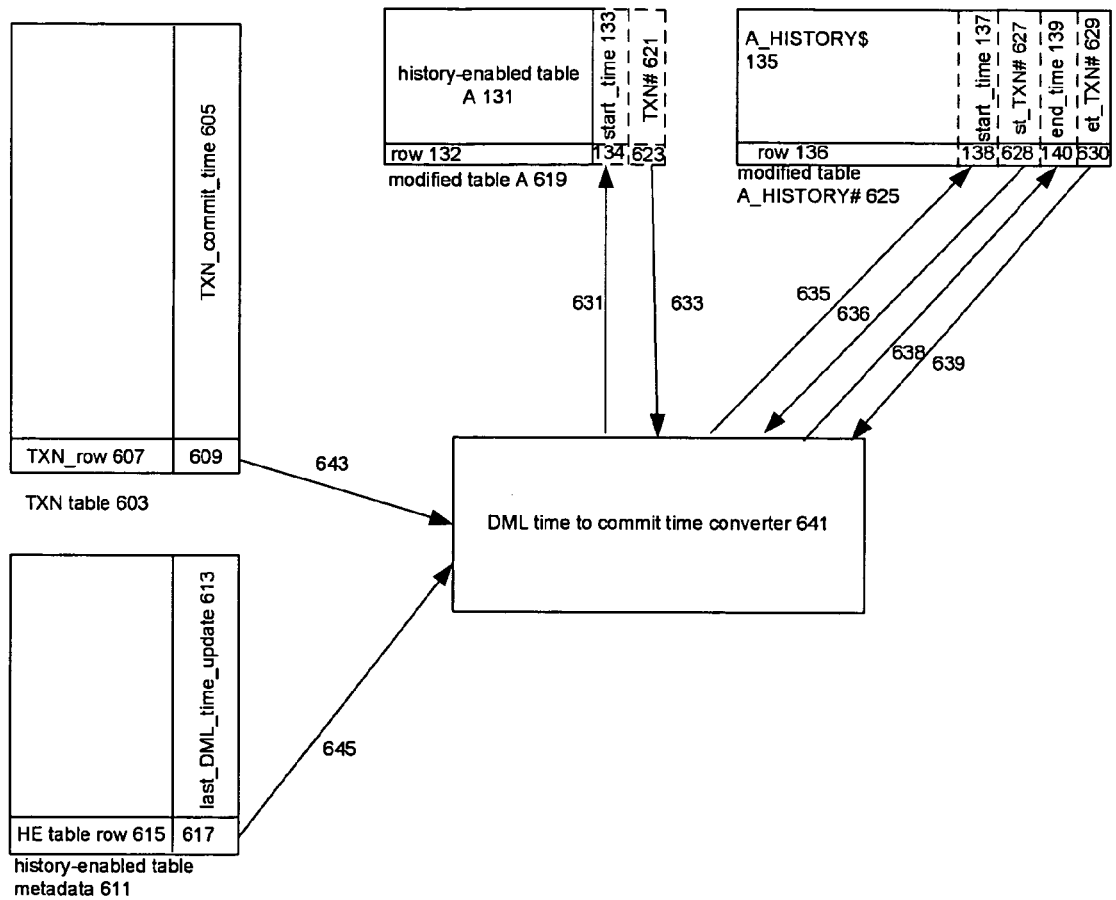
FIG. 6 shows a version of a history-enabled table that permits the use of DML times for start_time and end_time.

A solution to the problems of using DML time: FIG. 6

Situations like the one described above for DML time are not common and will never occur in many applications for which history-enabled tables are useful. However, where they can occur and the user desires the efficiency of using DML time without losing the guaranteed correctness of using commit time, the approach 601 shown in FIG. 6 may be employed.

Both the original and history tables are enhanced with an additional transaction number column for each start_time column 133 and 137 and end_time column 139. The values in the transaction number columns indicate the transactions in which the values in the start_time and end_time columns changed. These enhanced tables are shown at 619 and 625 in FIG. 6 and the added columns at 621, 627, and 629. Whenever a timestamp is written in start_time field 133, the transaction number for the transaction that performed the operation that caused the timestamp to be written is written to the corresponding transaction number field 623 through flow 633; when a new row 136 is written in A_HISTORY$ table 135, fields 134 and 623 from the row in table A 131 are written and to fields 138 and 628 through flows 635 and 636, and when field 140 is written through flow 638, the transaction number for the transaction that caused the new row 136 to be written is written to field 630 through flow 639.

Further, we separately maintain a record of the commit timestamps of all transactions. This information is traditionally maintained in a system table in most database systems In FIG. 6, it appears in TXN table 603, which has a row 607 for each transaction. A transaction's row is accessible by transaction number. One of the columns in table 603 is TXN_commit_time 605, Field 609 belonging to this column in each row contains the commit time for the row's transaction. There is also a system utility program—here termed DML time to commit time converter 641 which can be invoked occasionally during quiet periods (say, Sundays at midnight) to convert the DML times in fields 134, 138, and 140 to commit times. Only the most recently changed rows need to be touched, namely those that were changed after the immediately prior invocation of the utility program for the history-enabled table. The information as to the last invocation of the utility program for a given history-enabled table is contained in a system table 611 of history-enabled table metadata which contains a row 615 for each history-enabled table. There is a column 613 in this table for the last time the DML times in the history-enabled tables were updated to commit times, and the field 617 for this column in a given row has a time stamp for the last time the updating was done for the history-enabled table represented by the row.

The algorithm is straightforward: When utility program 641 is invoked for a given history-enabled table (table A 131 in FIG. 6), it obtains the timestamp for the last time the DML times in table A 131 and its associated A_HISTORY$ table were updated to commit times from field 617 in history-enabled table metadata 611 (arrow 645) and then finds the rows in tables A 131 and A_HISTORY$ 135 whose timestamps in fields 134, 138, and 140 indicate times later than the time of the last update. These timestamps specify DML times. For each of these rows and for each timestamp in the that indicates a time later than the time of the last update, converter 641 uses the transaction number associated with the timestamp to query TXN table 603 for commit time 609 for the transaction, as shows by arrow 643, and replaces the DML time time stamp with the commit time timestamp from TXN table 603. The flow of transaction numbers from these rows to the converter is shown at 623, 628, and 630; the flow of commit time timestamps that replace the DML time stamps is shown at 631, 636, and 638. It should be pointed out here that the foregoing technique for converting a non-commit-time time stamp that identifies the time of an event in a transaction to a commit time time stamp for the transaction can be used in any situation in which the row that has the non-commit-time time stamp for the time of the event includes a field whose value is the transaction number for the transaction in which the event occurred.

Of course, an RDBMS may provide both options: commit time as the start and end times where total consistency is required and DML time for high run-time performance. A further option with DML time would be the table modifications and timestamp conversion utility program just discussed.

CONCLUSION

The foregoing Detailed Description has disclosed to those skilled in the relational database field how to make and use history-enabled tables and has further disclosed the best mode presently known to the inventors of making and using the tables. Those skilled in the relational database field will immediately recognize that many embodiments of the concepts of the invention other than the one disclosed herein are possible. For example, the technique may be applied to any kind of table in a database system. The history-enabled table may be a new table that is created as history enabled or a previously defined or even preexisting table which is made into a history-enabled table. The history-enabled table and/or the history table may be views and the history view may be a materialized view or may be a base table which contains the history table rows and the rows of the history enabled table. The history-enabled table may contain fewer than all of the columns of the table it is based on, and the history table may contain a subset of the columns of the history-enabled table. The extent to which a relational database system provides support for history-enabled tables may vary from implementation to implementation, ranging from implementations in which the history-enabled table, the history table, and the history view and the triggers necessary to maintain them are defined by hand to implementations in which a routine such as EnableHistory is provided by the relational database management system to automate the process of history enabling a table. The degree to which the components of the history-enabled table are hidden from the user may vary from embodiment to embodiment. In some embodiments, for example, the user interface for performing temporal queries may give the appearance that the temporal query is being performed on the history-enabled table.

Many techniques may be used for representing the start time, the end time, and the period of time a version of a row was present in the history-enabled table. Moreover, many temporal queries may be performed in addition to the AS_OF and BETWEEN queries that are disclosed in detail herein. The forms of the invocations of the procedures used to create a history-enabled table and to perform queries on the history-enabled table are of course a matter of designer's choice.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

The invention claimed is:

1. A computer-implemented method of creating and maintaining a history-enabled table in a relational database system, comprising:
   using at least one processor to perform a process, the process comprising:
   identifying or creating a current row table by adding a start time column to a pre-existing table that comprises a current column in a relational database system and is to be history enabled;
   identifying or creating a row history table in the relational database system that includes a period column and a history column corresponding to the current column in the current row table;

tracking history of the pre-existing table without reading an undo log;

responding to a change in a field in a current row of the current row table, the field being in the current column corresponding to the history column of the row history table, by at least:

creating or updating a history row of the row history table to include a data of the field prior to the change in the field, in which the row history table comprising a row period value that indicates a time period between a start time value of the current row of the current row table and a change time at which the change occurs; and updating the start time value of the current row in the current row table to the change time at which the change occurs;

creating a history view that comprises a database view of a union of the current row table and the row history table, wherein the history view includes a period column, and a row period value in the period column is determined from the current row table and indicates a period of time that has not yet ended; and performing a temporal query on the history view by using at least a temporal query function defined by the relational database management system, wherein the temporal query function comprises a function that takes a period of time as a parameter and returns a set of rows of the history view for which the period of time overlaps another period indicated by the row period value of one of the set of rows of the row history table.

2. The history-enabled table set forth in claim 1, wherein the current row includes a row period field, and the row period value of the row period in the current row indicates a period that has not yet ended.

3. The history-enabled table set forth in claim 1, wherein the history row further includes a start time field;

when the current row is copied into a given history row, the start time value of the current row is copied into a corresponding start time field corresponding to the given history row; and the row period value comprises an end time value that is set when the history row is being copied to indicate a time of an update or deletion of the current row that is copied.

4. The history-enabled table set forth in claim 3, wherein the current row includes a row period field for the row period value, and the row period value indicates an end time value that indicates a period that has not yet ended.

5. The method of claim 1, wherein the current row table comprises a set of current rows and is determined by adding the start time column to the pre-existing table;

the row history table comprises a set of history rows; and the history-enabled table comprises a view which comprises a union of the current row table and the row history table.

6. The history-enabled table set forth in claim 5, wherein the view is materialized.

7. The history-enabled table set forth in claim 5, wherein the current row table and the row history table comprises respective base tables.

8. The history-enabled table set forth in claim 5, wherein the start time value and one or more times of one or more updates or deletions comprise commit times.

9. The history-enabled table set forth in claim 5, wherein the start time value and one or more times of updates or deletions comprise one or more DML times.

10. The history-enabled table set forth in claim 9, wherein the one or more DML times are later converted to one or more corresponding commit times.

11. The history-enabled table set forth in claim 1, wherein the current row in the pre-existing table comprises a current value of a data item instead of a prior value of the data item.

12. The history-enabled table set forth in claim 5, wherein in the union, the period column whose one or more row period values indicate a time period that has not yet ended is added to the set of current rows.

13. An apparatus for creating and maintaining a history-enabled table in a relational database management system, the apparatus comprising:

at least one processor;

a memory;

a pre-existing table in the relational database system that is to be history-enabled;

a history-enabled table creator that is to use the at least one processor to make a current row table by adding a start time column to the current row table comprising a column, corresponding to a current row in the pre-existing table, and to create a row history table that has a period column and a history row, the history row corresponding to the current row in the current row table, wherein the history-enabled table creator that is further to create a history view which comprises a database view of a union of the current row table and the row history table, and the history view is to include the period column, in which a row period value in the period column is determined from the current row table and indicates a period of time that has not yet ended;

a history-enabled table maintainer that is to use the at least one processor to respond to a change in a field in the current row of the current row table and to track history of the pre-existing table without reading an undo log, in which the history-enabled table maintainer is to update or create the history row in the row history table to include a data of the field prior to the change in the field, the row history table is to comprise a row period value that indicates a time period between a start time value of the current row of the current row table and a change time at which the change occurs, and the history-enabled table maintainer is to update the start time value of the current row in the current row table to the change time at which the change occurs; and a query engine that is to perform a temporal query on the history view by using at least a temporal query function that is defined by the relational database management system, wherein the temporal query function comprises a function that takes a period of time as a parameter and returns a set of rows of the history view for which the period of time overlaps another period indicated by the row period value of one of the set of rows of the row history table.

14. The apparatus set forth in claim 13, wherein the row history table as created by the history-enabled table further has a start time column;

the row period value is to indicate an end time value at which the change in the current row occurs; and the table maintainer is further to copy copies the copied current table row's a start time value of the current row in current row table to a corresponding field of the start time column of the history table.

15. The apparatus set forth in claim 13, further comprising:
a query engine that is to perform the temporal query on at least the row history table by using at least the temporal query function defined by the relational database management system.

16. The apparatus set forth in claim 13, wherein the temporal query function comprises a function that takes an instant of time as a parameter and returns a set of rows of the history view for which the instant of time is included in a period indicated by the row period value of one of the set of rows of the row history table.

17. The apparatus set forth in claim 13, wherein the temporal query function comprises a function that takes a period of time as a parameter and returns a set of rows of the history view for which the period of time overlaps another period indicated by the row period value of one of the set of rows of the row history table.

18. The apparatus for creating and maintaining a history-enabled table set forth in claim 13, wherein the table maintainer is to use a commit time as the start time and the change time at which the change in the current row table occurs.

19. The apparatus for creating and maintaining a history-enabled table set forth in claim 13, wherein the table maintainer is to use a DML time as the start time value and the change time at which the change in the current row table occurs.

20. The apparatus for creating and maintaining a history-enabled table set forth in claim 19, further comprising:
a DML time converter which is to convert the DML time to a corresponding commit time.

21. The apparatus set forth in claim 13, wherein the pre-existing table that is to be history enabled comprises a previously-defined table in the relational database management system.

22. A computer-implemented method of creating and maintaining a history-enabled table in a relational database system, the method comprising:
using at least one processor to perform a process, the process comprising:
identifying or creating a current row table by adding a start time column to a pre-existing table that comprises a current column in a relational database system and is to be history enabled;
identifying or creating a row history table in the relational database system that has a period column and a history column corresponding to the current column in the current row table;
tracking history of the pre-existing table without reading an undo log;
responding to a change in a field in a row of the current row table, the field being in the current column corresponding to the history column of the row history table, by at least:
creating or updating a history row of the row history table to include a data of the field prior to the change in the field, in which
the row history table comprising a row period value that indicates a time period between a start time value of the current row of the current row table and a change time at which the change occurs; and
updating the start time value of the current row in the current row table to the change time at which the change occurs;
creating a history view that comprises a database view of a union of the current row table and the row history table, wherein the history view includes a period column, and a row period value in the period column is determined from the current row table and indicates a period of time that has not yet ended; and
performing a temporal query on the history view by using at least a temporal query function defined by the relational database management system, wherein the temporal query function comprises a function that takes a period of time as a parameter and returns a set of rows of the history view for which the period of time overlaps another period indicated by the row period value of one of the set of rows of the row history table.

23. The method set forth in claim 22, wherein
the action of identifying or creating the row history table further comprising adding a start time column to the row history table, and
the row period value corresponds to an end time value that indicates an end time at which the change occurs, and the the start time column of the current row table is updated with the start time value.

24. The method set forth in claim 22, further comprising:
performing a temporal query on at least the row history table by using at least a temporal query function defined by the relational database management system.

25. The method set forth in claim 22, further comprising:
creating a history view that comprises a database view of a union of the current row table and the row history table.

26. The method set forth in claim 25, further comprising:
performing a temporal query on the history view by using at least a temporal query function defined by the relational database management system.

27. The method set forth in claim 25, wherein the history view includes a period column, and a row period value in the period column is determined from the current row table and indicates a period of time that has not yet ended.

28. The method set forth in claim 27, further comprising:
performing a temporal query on the history view by using at least a temporal query function defined by the relational database management system.

29. The method set forth in claim 28, wherein the temporal query function comprises a function that takes an instant of time as a parameter and returns a set of rows of the history view for which the instant of time is included in a period indicated by the row period value of one of the set of rows of the row history table.

30. The method set forth in claim 28, wherein the temporal query function comprises a function that takes a period of time as a parameter and returns a set of rows of the history view for which the period of time overlaps another period indicated by the row period value of one of the set of rows of the row history table.

31. The method of creating and maintaining a history-enabled table set forth in claim 22, wherein in the action of responding to the change, the start time and the time at which the change occurs comprise one or more commit times.

32. The method of creating and maintaining a history-enabled table set forth in claim 22, wherein
in the action of responding to the change, the start time and the time at which the change occurs comprise DML times.

33. The method of creating and maintaining a history-enabled table set forth in claim 32, further comprising:
converting the DML times to corresponding commit times.

34. The method of creating and maintaining a history-enabled table set forth in claim 22, wherein the pre-existing table to be history enabled comprises a previously-defined table in the relational database management system.

35. An apparatus for creating and maintaining a history-enabled table in a relational database management system, comprising:
- at least one processor;
- a memory;
- a pre-existing table in the relational database system that is to be history-enabled;
- a history-enabled table creator that is to use the at least one processor to make a current row table by adding a start time column to the current row table comprising a column, corresponding to a current row in the pre-existing table, and to create a row history table that has a period column and a history row,
  - the history row corresponding to the current row in the current row table,
  - wherein
  - the history-enabled table creator is further to create a history view that comprises a database view of a union of the current row table and the row history table, and
  - the history view includes the period column, in which a row period value in the period column is determined from the current row table and indicates a period of time that has not yet ended;
- a history-enabled table maintainer that is to use the at least one processor to respond to a change in a field in the current row of the current row table and to track history of the pre-existing table without reading an undo log, wherein
  - the history-enabled table maintainer is to update or create the history row in the row history table to include a data of the field prior to the change in the field,
  - the row history table comprising a row period value that indicates a time period between a start time value of the current row of the current row table and a change time at which the change occurs, and
  - the history-enabled table maintainer is to update the start time value of the current row in the current row table to the change time at which the change occurs; and
- a query engine that is to perform a temporal query on the history view by using at least a temporal query function that is defined by the relational database management system, wherein the temporal query function comprises a function that takes a period of time as a parameter and returns a set of rows of the history view for which the period of time overlaps another period indicated by the row period value of one of the set of rows of the row history table.

* * * * *

UNITED STATES PATENT AND TRADEMARK OFFICE
CERTIFICATE OF CORRECTION

| | | |
|---|---|---|
| PATENT NO. | : 8,156,083 B2 | |
| APPLICATION NO. | : 11/291446 | |
| DATED | : April 10, 2012 | |
| INVENTOR(S) | : Banerjee et al. | |

It is certified that error appears in the above-identified patent and that said Letters Patent is hereby corrected as shown below:

On front page, in column 2, under "Primary Examiner", line 1, delete "Naveen" and insert -- Neveen --, therefor.

On page 2, in column 2, under "Other Publications", line 2, delete "wwvv" and insert -- www --, therefor.

On sheet 1 of 6, in figure 1, below "Fig. 1" insert -- 101 --.

In column 3, line 44, delete "Kelly," and insert -- Kelley, --, therefor.

In column 3, line 47, after "primary" insert -- database --.

In column 6, line 22-33, below "109." delete "Correspondingly, data 113 in memory 103 includes data for the application programs 115, data for the operating system 119, and data for the database system. Operation typically involves an application program 111, which provides a query to relational database program 109. Database program 109 executes the query on the tables in persistent storage 123 and provides the result to application program 111. Both RDB program 109 and application program 111 use the services provided by operating system 107, and execution of the application program or the database RDB program may involve inputs from and outputs to I/O devices and the network.", and insert the same on Col. 6, Line 21, as a continuation of the same Paragraph.

In column 8, line 62, delete "enables," and insert -- enabled, --, therefor.

In column 8, line 66-67, delete "HISTORY VIEW$" and insert -- HISTORY_VIEW$ --, therefor.

In column 9, line 17, delete "quires" and insert -- queries --, therefor.

Signed and Sealed this
Thirty-first Day of July, 2012

David J. Kappos
*Director of the United States Patent and Trademark Office*

CERTIFICATE OF CORRECTION (continued)
U.S. Pat. No. 8,156,083 B2

In column 9, line 18, delete "tot eh" and insert -- to the --, therefor.

In column 10, line 56, delete "2000;" and insert -- 2000. --, therefor.

In column 12, line 11, delete "in in" and insert -- in --, therefor.

In column 12, line 27, delete "Tlstart," and insert -- T1start, --, therefor.

In column 13, line 53, delete "time time" and insert -- time --, therefor.

In column 13, line 60, delete "commit time time stamp" and insert -- commit time timestamp --, therefor.

In column 16, line 64, in Claim 14, delete "copy copies" and insert -- copy --, therefor.

In column 18, line 19, in Claim 23, before "start" delete "the".